June 4, 1957   R. W. HUXTABLE   2,794,468
WOODCUTTING BIT ASSEMBLY
Filed Dec. 4, 1952
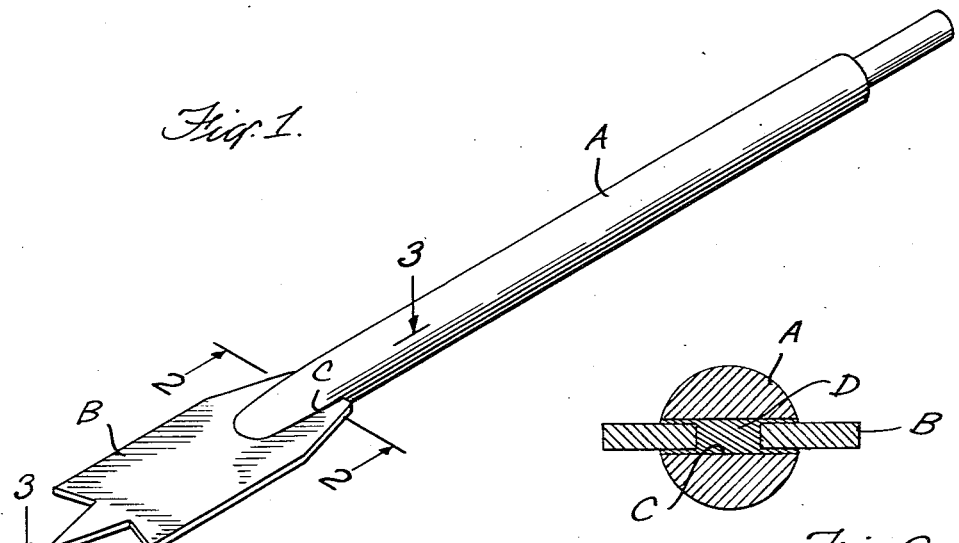
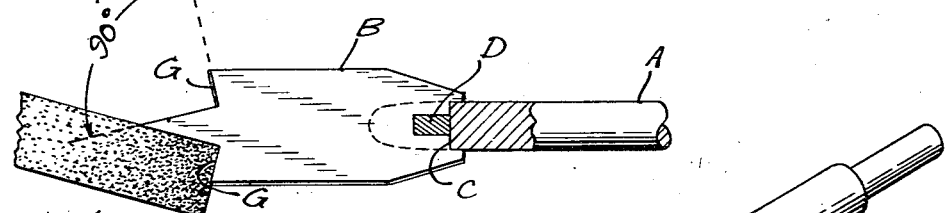
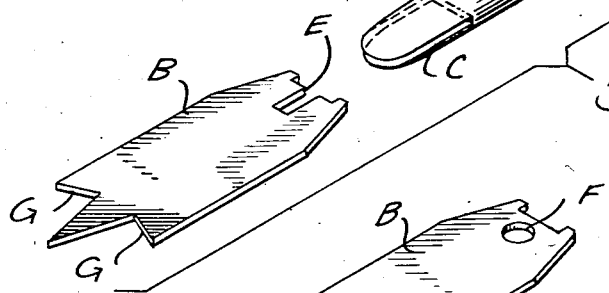
INVENTOR
ROBERT W. HUXTABLE
BY
Frederic P. Warfield
ATTORNEY.

United States Patent Office 2,794,468
Patented June 4, 1957

2,794,468
WOODCUTTING BIT ASSEMBLY

Robert W. Huxtable, Greenfield, Mass., assignor to Millers Falls Company, Greenfield, Mass., a corporation of Massachusetts Application December 4, 1952, Serial No. 323,978

1 Claim. (Cl. 145—116)

This invention relates to woodcutting bits and its object is to provide an improved bit which will cut efficiently not only through wood, but through any nails or metal pieces which may be encountered, and also a method for the manufacture of such bit.

The invention accordingly comprises the features of construction, combinations of elements, and arrangement of parts, which will be exemplified in the construction hereinafter set forth, and the scope of the application of which will be indicated in the claims.

For a fuller understanding of the nature and objects of this invention, reference should be had to the following detailed description taken in connection with the accompanying drawings, in which:

Figure 1 shows a completed bit.

Figure 2 is a section on the line 2, 2 Figure 1 looking in the direction of the arrows.

Figure 3 is a partial section on the line 3 of Figure 1.

Figure 4 shows the two parts of the bit separated; and

Figure 5 shows a modification in the form of the blade.

The shank A is made of carbon steel, turned and slotted. The blade B is made from high speed steel hardened and tempered and assembled to the slot C in the end of the shank A with a small slug D of brazing alloy first being placed in the notch E at the back of the blade. The two parts are then held in alignment in a fixture and the correct heat is applied to cause the brazing alloy to melt and flow evenly through the joint, with the result as shown in Figure 2. This brazing heat is not high enough to draw the temper in the blade.

In the form of blade shown in Figure 5, a hole F is shown as an alternative of the notch C of Figure 4.

The blade as shown is made with a right angle at the point where the pointed tip of the blade leaves the main body of the blade, as shown at G, and this enables the sharpening of the blade by grinding wheel or other form of sharpening device, of a shape to fit in this right angle, thereby making the sharpening operation simple and less expensive.

The resulting blade is most efficient for its use and can be manufactured readily and economically.

Since certain changes may be made in the above construction, and different embodiments of the invention could be made without departing from the scope thereof, it is intended that all matter contained in the above description or shown in the accompanying drawings shall be interpreted as illustrative and not in a limiting sense.

It is also understood that the following claims are intended to cover all of the generic and specific features of the invention herein described, and all statements of the scope of the invention which as a matter of language might be said to fall therebetween.

Having described my invention, what I claim as new and desire to secure by Letters Patent is:

A wood cutting tool which comprises a shank of low carbon steel having an axially-centered slot through an end thereof, a flat sided high speed steel cutting blade of a thickness approximating the width of said slot and said blade having a flat sided end portion thereof received in said slot and an opening in said end portion, the sidewalls of said opening being substantially normal to the flat sides of said cutting blade and said opening being closed off by the opposite faces of said slot and said opening further being less in transverse extent than the transverse length of said slot thus affording portions of said blade closing margins of said slot on opposite sides of said opening and producing an internal cavity between said blade and shank, and a slug of brazing material situated in said cavity to be melted and braze together the adjacent parts.

References Cited in the file of this patent

UNITED STATES PATENTS

| 124,092 | Shepardson | Feb. 27, 1872 |
| 985,283 | Pratt | Feb. 28, 1911 |
| 988,092 | Hanlin et al. | Mar. 28, 1911 |
| 1,191,717 | Moore | July 18, 1916 |
| 2,168,060 | Catland | Aug. 1, 1939 |
| 2,334,755 | Eglinton | Nov. 23, 1943 |
| 2,543,206 | Smith | Feb. 27, 1951 |
| 2,579,268 | Malherbe | Dec. 18, 1951 |
| 2,614,813 | Shepherd | Oct. 21, 1952 |
| 2,628,072 | Baker | Feb. 10, 1953 |

FOREIGN PATENTS

| 30,082 | Austria | Sept. 25, 1907 |
| 17,756 | Great Britain | Aug. 4, 1911 |
| 123,605 | Great Britain | Mar. 5, 1919 |